Figure 4:
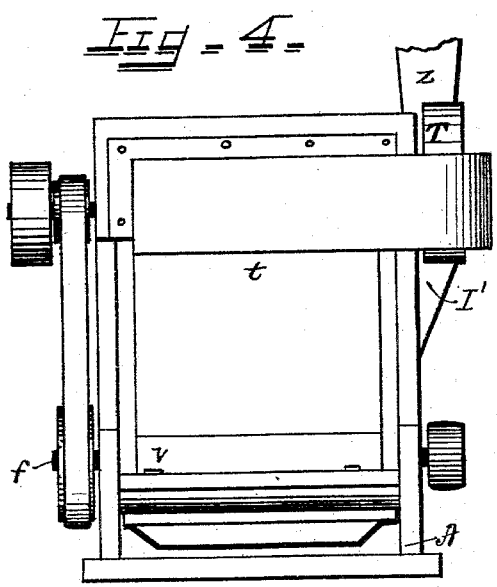

(No Model.)
M. HAY.
THRASHING MACHINE.
No. 548,540. Patented Oct. 22, 1895.
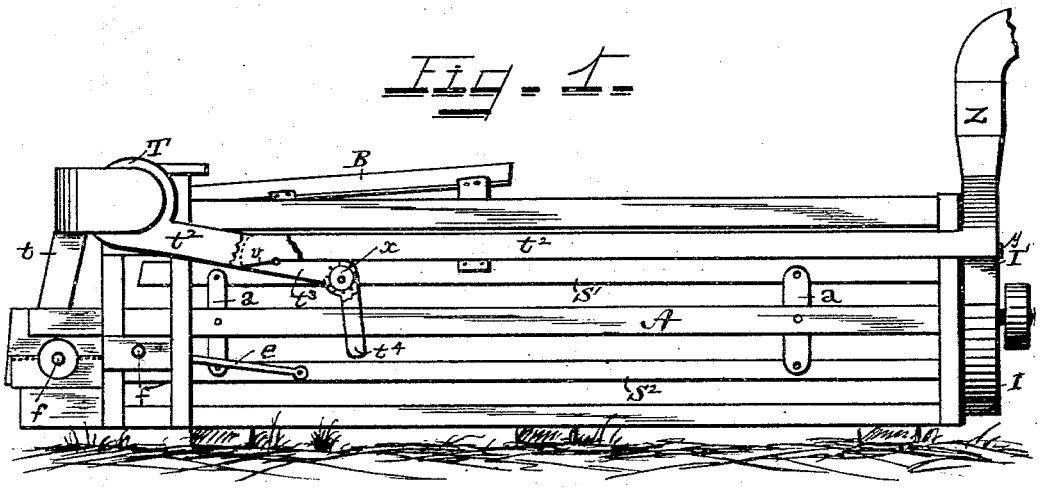
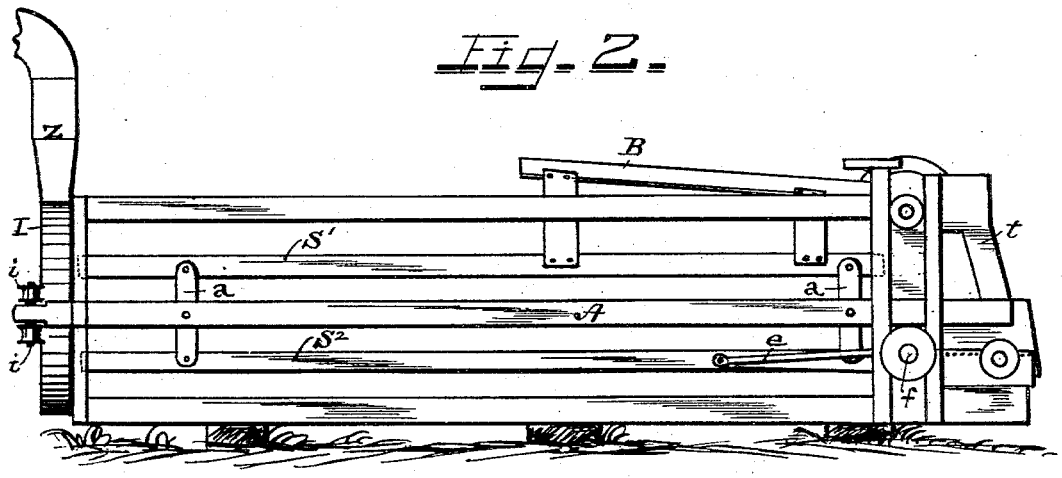
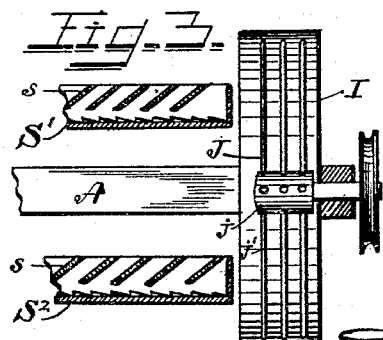
Witnesses:
D. W. Thrasher
J. M. Chuck
Madison Hay
Inventor:
by L. M. Hoad
Attorney.

(No Model.) 2 Sheets—Sheet 2.

M. HAY.
THRASHING MACHINE.

No. 548,540. Patented Oct. 22, 1895.

Witnesses:
D. W. Thrasher
J. M. Chuck

Madison Hay
Inventor
By L. M. Hood
atty.

UNITED STATES PATENT OFFICE.

MADISON HAY, OF DARKE COUNTY, ASSIGNOR OF ONE-HALF TO JESSE R. HAY, OF CINCINNATI, OHIO.

THRASHING-MACHINE.

SPECIFICATION forming part of Letters Patent No. 548,540, dated October 22, 1895.

Application filed February 2, 1895. Serial No. 537,108. (No model.)

*To all whom it may concern:*

Be it known that I, MADISON HAY, a citizen of the United States, residing in Darke county, Ohio, (post-office address Union City, Indiana,) have invented new and useful Improvements in Thrashing-Machines, of which the following is a specification.

My invention relates to thrashing-machines, its object being to simplify the construction and increase the efficiency both in quantity and quality of the work done in a given time and with a given amount of applied power, to which end the invention consists generally, first, in the combination, with a thrashing-cylinder, of two independent shakers arranged below and in rear of the cylinder to receive the straw in equal portions from the cylinder and operated simultaneously, each acting independently of the other to carry and deliver the straw to the feed-out end of the machine and collect and deliver the grain to the feed-in end of machine; second, in the combination, in a thrashing-machine, of one or more shakers or straw-carriers, an open circular casing arranged across the feed-out end of the shakers, and a rotating fork-wheel operating in the casing transversely to the line of feed and delivering the straw tangentially outward into the stacker-tube, where it is seized and impelled outward by a forced blast of air operating the stacker; third, in means suitably constructed and arranged for winnowing the grain upon the riddle by an indraft of air and utilizing said draft at the exhaust end to operate the stacker for disposing of the thrashed straw, whereby but one blower and air-current are required; fourth, in the combination, with the thrashing-cylinder and cleaning apparatus, of self-feeding devices, whereby the feeding operation of the machine is rendered automatic and self-regulating; fifth, in the combination of the chaff-separating and air-propelling devices, whereby the mechanism for producing an air-draft is also utilized to thrash out any heads and separate the grain remaining with the chaff and other refuse and return the same to the winnowing apparatus; sixth, and lastly, in the general construction and arrangement of the machine as a whole and in certain particulars hereinafter pointed out, tending to the more perfect operation of thrashing the grain.

Mechanism embodying my invention is illustrated in the accompanying drawings, in which—

Figure 5:
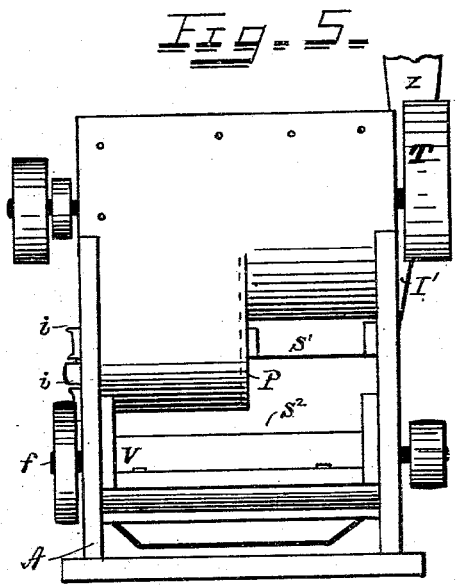
Figure 6:
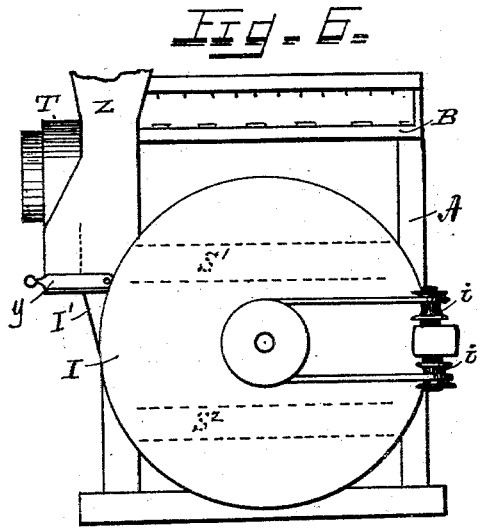
Figure 7:
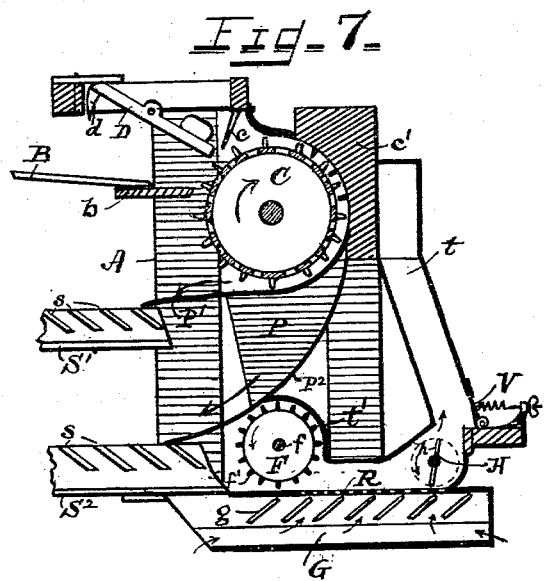

Figures 1 and 2 are side elevations at opposite sides of a thrashing-machine, the side boards and curtains being omitted in order to exhibit more clearly the constructive features. Fig. 3 is a detail axial section of the rotary straw-fork casing, showing the construction of the fork and the relation of the shakers to the casing. Figs. 4 and 5 are similar end elevations of the feed-in end of the machine, the air-conduit being removed in Fig. 5 to show the construction and relation of the central dividing-partition and the guide-chutes for delivering the thrashed straw from the thrashing-cylinder equally to the two shakers. Fig. 6 is an end elevation of the machine at the feed-out end, showing the rotary fork-casing and stacker. Fig. 7 is a vertical longitudinal section of the front end of the machine, showing the position and functional relations of the feeding devices, thrashing-cylinder, guide-chutes, shakers, winnowing apparatus, and air-conduit.

Referring now to the drawings, A designates generally the framing of a thrashing-machine, upon which are mounted the feeding, thrashing, and winnowing apparatus at the front end, two vibratory shakers, one above the other, extending from front to rear, at the rear a straw-forking apparatus to seize and throw the straw into the stacker, and air-propelling apparatus to winnow out the chaff at the front end of the machine and exhaust it at the rear into the stacker, where the same air-current operates the stacker. These, constituting the general features of my improvement, will be described and referred to in the above order as far as possible.

The feeding apparatus consists of a vibrating trough B, carried in a somewhat inclined position immediately behind the thrashing-cylinder C and delivering upon a shelf *b* in fixed relation with the cylinder C. The bottom of the feeding-trough B is formed with a succession of transverse dentate ridges having the cross-section of ratchet-teeth, as indicated, so that the recurrent fore-and-aft movement tends to carry the grain-bundles continually forward to the cylinder C. For convenience I attach the feeding-trough B to the upper shaker S', (presently to be described,) so as to partake of its motion.

Immediately above the thrashing-cylinder C, I place a fixed row of teeth $c$ in such relation with the cylinder as to catch and retain any straw in excess of the proper quantity to be fed to the cylinder and prevent clogging. In connection with these devices I employ above and immediately behind the thrashing-cylinder, over the feed-trough, a feed-regulator consisting of a tilting frame D, overweighted at its front or delivery end and oscillating in close proximity to the front row of teeth $c$. In its normal position it stands at an acute angle with the bottom of the feed-shelf $b$, as shown in Fig. 7, and when a bundle of straw is drawn in by the action of the cylinder the end of the frame adjacent to the cylinder is tilted upward by the bundle and the excess of straw is caught on the teeth $c$ and the opposite end of the frame is tilted downward into the path of the incoming bundles in the feed-trough B. The end of the tilting frame farthest from the cylinder is provided with a series of knives $d$, acting as teeth to prevent the passage of grain to the thrashing-cylinder until that under treatment is disposed of and the counterweighted end of the frame D descends and clears the teeth $c$ of the excess of straw caught thereby, as before described. The knives $d$ also operate to cut the tying wisps or twine of the bundles. There is thus constituted a self-feeding apparatus which is automatically self-regulating and perfectly sure and constant in its action, keeping the supply of grain to the thrashing-cylinder constant and uniform.

The rotary motion of the cylinder C is toward the front of the machine at the upper diametric arc of travel, and the "concave" $c'$ is arranged, as shown in Fig. 7, at the forward half of said arc in such relation that the centrifugal action of the cylinder throws the product directly downward into two guide-chutes $P'$ $P^2$, divided vertically by a central partition P, Fig. 5, and curving rearward, as shown in Fig. 7, to deliver in approximately equal increments to two shakers $S'$ $S^2$, arranged one above another and extending thence rearward.

Suitable arrangement may be made for distributing the straw delivered to each shaker at one side of its longitudinal center uniformly over its entire width of surface; but as very simple mechanical means may be adopted I have not shown any special means in this application.

The shakers $S'$ $S^2$ are shallow rectangular troughs with closed bottom, rear ends and sides, and open in front, extending in parallel relation horizontally to the rear. They are provided with a series of transverse riddle-slats $s$, inclined rearwardly and extending from side to side above the inclosed bottoms, the bottoms being corrugated with forwardly-inclined transverse ribs, as indicated in cross-section, Fig. 6. The two shakers are carried upon pivoted supporting-arms $a$ at each side, front, and rear, which, in turn, are centrally pivoted to the supporting-frame A. A vibratory motion is given to the lower shaker by connecting-rods $e$, Figs. 1 and 2, driven by eccentrics upon the shaft $f$ of a riddle-feeding cylinder F, presently to be described, and by means of the oscillating supports this motion is communicated simultaneously to the upper shaker. The action of the shakers is to carry the straw rearwardly upon the slats $s$, while the grain, falling through the slats to the bottom of the shaker-troughs, is impelled forwardly and dropped, together with the accompanying chaff, into the cleaning apparatus constructed and arranged as follows: A trough G is provided, having closed sides and bottom and attached as a forward extension to the lower shaker $s^2$ at a slightly-lower level and partaking of its motion. Between the sides of this trough above its bottom is a row of transverse slats $g$, inclining forwardly, and above these is carried its perforated riddle-plate R, so placed as to constitute substantially a forward extension of the bottom of the lower shaker $S^2$. Near the forward end of the shaker (allowing for its vibratory movement) in the frame A is arranged a riddle-feeding cylinder F, carried upon a shaft $f$ and provided with radial wings $f'$, extended longitudinally as projections from its peripheral surface, operated close to the riddle-plate R to carry forward the grain and chaff brought forward by the shakers. Immediately in front of the cylinder F begin the perforations of the plate R, these perforations being preferably most numerous near the cylinder and progressively less so toward the front or discharge end of the plate, where is arranged a "picker" H, a rotating shaft having one or more sets of radial teeth $h$ arranged in longitudinal series. By this construction and arrangement of parts all the grain and foreign matter brought forward by the shakers are delivered to the riddle-plate and made to pass beneath the riddle-feeding cylinder F, which serves to prevent clogging and insures a uniform feed to the winnowing apparatus now to be described.

The winnowing action is performed by the vibrating movement of the riddle-plate R in connection with an indraft of air from the open ends of the trough G upward between the slats $g$ and through the perforations of the riddle-plate R. The source of the indraft is a "blower" T, preferably of a type having rotary fan-blades, taking air at the side of its casing and exhausting tangentially. The blower T is carried at the projecting end of the thrashing-cylinder shaft and is supplied through a conduit $t$, extending around the front of the machine and downward to a point near the discharge end of the riddle-plate R. The walls of the conduit are extended, as at $t'$, Fig. 7, to cover the cylinder F and connect with the outer walls of the guide-chutes $P'$ $P^2$ to form a practically air-tight joint and confine the source of air-supply to the open ends of the trough G. The "picker" H is intended to seize and throw the chaff and refuse more directly forward into the conduit $t$, and thus prevent clogging. At a convenient point in the conduit, preferably near the picker H, is arranged an indrawing air-valve V, normally held closed by a spring or overbalancing-weight, so regulated that in case of the too great force of the air-draft through the winnowing apparatus the valve will automatically and partially supply the demand for air from the outside, and thus regulate the winnowing action and render the same uniform. The action of this portion of the apparatus, it will be observed, tends to clean the grain most efficiently and dispose with equal efficiency of all chaff and refuse. Moreover, by reason of the indraft of air into the machine the final attrition of grain against grain in the bottom of the trough G takes place in an air-current that carries away even the dust of such attrition. To finally recover the grain remaining in unthrashed heads or such as may be entangled in the chaff or refuse the blower T is utilized as follows: The air-conduit $t$ conveys all chaff and refuse to the blower T, where they are seized by the rapidly-revolving arms of the blower and discharged tangentially into an exhaust extension $t^2$ of the air-conduit where they are carried rearward, and whose final discharge-mouth constitutes the "stacker" Z.

As any grain that may be contained in the air-current will possess gravity greater than the chaff and other refuse, I arrange in the conduit $t^2$ a branch $t^3$, leading out below at a point beyond the blower T, and govern the connection-opening by a valve $v$, arranged to lift from the bottom to any height desired. The valve thus operates as a deflecting-tongue to direct all matters below its general level (in relation to the cross area of the conduit) into the lower branch $t^3$. Within the lower branch I arrange a rotary cylinder $x$, having a series of longitudinal wings, (similar in construction to the cylinder F,) which practically fills the area of the branch and operates as a valve to prevent outflow of air, while at the same time it carries forward any grain or chaff in the branch into a spout $t^4$, leading to and discharging upon the lower shaker. By these means I recover practically all the grain.

As the machine has relatively double the ordinary shaker capacity provided for the thrashing-cylinder, the layer of straw upon each shaker is but one-half the usual depth, and the action of the shaking mechanism is therefore doubly as efficient.

I have not herein shown the lifting-fingers and other customary adjuncts of the shakers; but it will be understood that they will be used.

The straw is carried back by the shakers $S'$ $S^2$, to an open cylinder-casing I at the rear, in which a rake-wheel J is rotated, by which the straw is seized and discharged into a tangential discharge-mouth $I'$, opening immediately into the stacker Z. The rake-wheel consists merely of a hub $j$ with two or more series of straight rake or fork teeth $j'$ in groups of two or three. (See Fig. 3.) The centrifugal action of the rotating rake or fork throws the straw forcibly into the stacker-tube, where it is seized and ejected by the exhaust air-blast. The rake or fork wheel may be driven by belt or other connections at the outside of the frame around idler-pulleys $i\,i$ or otherwise.

The operation of the machine as a whole may be recapitulated as follows: Power being applied in the first instance to the shaft of the thrashing-cylinder C is transmitted directly to the blower T, located on the extension of said shaft, and by means of belting to the riddle-feeding cylinder F and picker H, and also to the rake or fork wheel J. Bundles of grain being placed upon the platform of the feeding-trough B are by the vibratory action of the feeding-trough gradually carried forward and seized by the teeth of the thrashing-cylinder C, the feed being regulated by the co-operation of the row of fixed teeth $c$ and the tilting regulator-frame D. After passing from the thrashing-cylinder and its concave $c'$ the thrashed straw is delivered equally to the shakers $S'$ $S^2$, and thence carried rearwardly upon the slats $s$ by the vibratory action of the shakers, the grain sifted therefrom being dropped to the bottom of the shakers and fed forwardly and dropped to the riddle-plate R, upon which it is forced forward by the riddle-feeding cylinder F. The vibratory action of the riddle-plate sifts the grain through its apertures to the bottom of the trough, while the air-draft induced by the blower T, passing up through the apertures of the riddle-plate, carries the chaff and refuse, aided by the picker H, into the air-conduit $t$, where, after a further thrashing action of the blower-arms, they are finally ejected at the stacker Z, together with the straw thrown in by the action of the rotary rake or fork wheel. Any grain thrashed out by the blower T is caught in the branch $t^3$ and returned to the lower shaker to be again delivered to the riddle-plate. At the rear end of the conduit $t^2$, before turning upward to the stacker, I place a valve $y$, which, being opened, will allow the chaff and refuse to make its exit at that point separate from the straw delivered through the stacker.

I claim as my invention and desire to secure by Letters Patent of the United States—

1. In a thrashing machine, in combination with a feed-trough or carrier, a thrashing cylinder rotating upwardly in relation thereto at the feeding side, and a transverse series of fixed teeth projecting from above, downwardly, in approximately tangential relations to said thrashing cylinder at its receiving side, in such relations that the excess of straw, fed to the cylinder is caught and forced upward upon said teeth, in combination with a frame in proximate relations to said teeth so as to be lifted upward by the straw caught thereon and by its descent to clear the teeth, substantially as set forth.

2. In a thrashing machine, in combination with a feed-trough or carrier, a thrashing cylinder, and a tilting-frame arranged above the feed-trough or carrier at the receiving-side of the cylinder, in such relations that an excess of straw, fed to the cylinder, lifts the proximate and depresses the remote end of the frame, and by such depression retards or prevents the further passage of straw beneath the frame, substantially as set forth.

3. In a thrashing machine, the combination of the feed-trough or carrier, the thrashing cylinder, the row of tangential teeth, and the tilting frame, arranged and operating as set forth.

4. In a thrashing machine, in combination with a thrashing cylinder; the feed-trough or platform; and the tilting feed-regulator; of a series of knives carried upon the regulator to sever the sheaf-bands or cords; substantially as set forth.

5. In a thrashing machine, in combination with the thrashing cylinder; two independent shakers mounted one above the other, below and in rear of the cylinder, and operating simultaneously, in equal receiving relations with the same; and provided with means, each independently of the other to carry the straw to the rear and the sifted grain to the front; a stacking apparatus at the straw delivery end of the shakers; and a grain winnowing apparatus at the grain delivery end of the same; substantially as set forth.

6. In a thrashing machine, in combination with the thrashing cylinder, two independent vibratory shakers and grain carriers, arranged one above the other in equal receiving relations with the cylinder, and simultaneously operated, each having a series of slats between the sides and inclined rearwardly above a closed bottom, and a series of forwardly inclined ratchet ribs upon the closed bottom, whereby the straw is carried rearwardly and the grain forwardly, substantially as set forth.

7. In a thrashing machine, in combination with a vibratory shaker or shakers, an open circular shallow casing of a diameter approximately the width of the shaker arranged transverely across the delivery end of the shaker or shakers and having a tangential discharge mouth, and a rotary hub carrying a series of rake teeth centered and operating in said casing, and means independent of the rake, to siphon and eject the straw, delivered at said tangential discharge mouth, substantially as set forth.

8. In a thrashing machine, the combination of a thrashing cylinder; a vibrating shaker or shakers arranged in receiving relations with the cylinder and adapted to carry and discharge the straw at the rear and the grain at the front; a stacking apparatus arranged in receiving relations at the straw-end of the shakers; a winnowing apparatus arranged in receiving relations at the grain-end of the shakers; a single air forcing apparatus arranged upon the machine; and an indraft conduit connecting it thence with the winnowing apparatus to operate the same; and an exhaust conduit connecting it thence with the stacking tube to operate the same said conduits being independent of other parts and functions of the machine, substantially as set forth.

9. In a thrashing machine, the combination of an air conduit: and means for inducing a current of air therein: a riddle-plate across the inlet mouth of said conduit and arranged in receiving relations with the shakers; a riddle-feeding cylinder interposed in the feed-path between the shaker and the riddle-plate and constituting a valve-closing the feed aperture of the conduit; and a "picker" at the feed-out end of the riddle to aid in passing the refuse into the exhaust-conduit, substantially as set forth.

10. In a thrashing machine, the combination of a winnowing apparatus: air-propelling device, and conduits, and shaker, of an adjustable gate or valve in the exhaust conduit and a branch outlet in connection therewith leading to the shaker, substantially as set forth.

11. In a thrashing machine, the combination of a stacker, and an independent out-draft conduit carrying the chaff and operating the stacker, with an outlet valve in the chaff conduit, adapted to discharge the chaff independently of the stacker, substantially as set forth.

In testimony whereof I have hereunto set my hand in the presence of two subscribing witnesses.

MADISON HAY.

Witnesses:
L. M. HOSEA,
T. M. CHUCK.